US007821510B2

(12) United States Patent
Aksemit et al.

(10) Patent No.: US 7,821,510 B2
(45) Date of Patent: Oct. 26, 2010

(54) DYNAMIC CONFERENCE TABLE DISPLAY SYSTEM

(75) Inventors: Slavek Aksemit, Austin, TX (US); David Chudy, Raleigh, NC (US); Christian Medina, Durham, NC (US); Dharmesh Topiwala, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 11/735,050

(22) Filed: Apr. 13, 2007

(65) Prior Publication Data

US 2008/0256461 A1 Oct. 16, 2008

(51) Int. Cl.
 *G09G 5/00* (2006.01)
(52) U.S. Cl. .................. 345/204; 345/629; 345/156
(58) Field of Classification Search .................. 345/690, 345/751, 156, 82, 204, 180, 545, 157, 629; 705/14.12–14.39, 16, 17, 10; 715/753, 751, 715/838, 273
 See application file for complete search history.

(56) References Cited

U.S. PATENT DOCUMENTS

| | | | | |
|---|---|---|---|---|
| 3,653,001 | A * | 3/1972 | Ninke | 345/690 |
| 3,728,481 | A * | 4/1973 | Froehlich et al. | 348/25 |
| 5,347,734 | A | 9/1994 | Howell et al. | |
| 5,513,306 | A * | 4/1996 | Mills et al. | 715/202 |
| 5,694,544 | A * | 12/1997 | Tanigawa et al. | 715/753 |
| 6,417,819 | B1 * | 7/2002 | Matsumoto et al. | 345/1.1 |
| 6,786,407 | B1 * | 9/2004 | Takasugi | 235/451 |
| 7,109,417 | B1 | 9/2006 | Beam | |
| 7,518,633 | B2 * | 4/2009 | Horie | 348/207.1 |
| 2004/0027392 | A1 * | 2/2004 | Dunn et al. | 345/810 |
| 2004/0075621 | A1 | 4/2004 | Shiuan et al. | |
| 2004/0075638 | A1 * | 4/2004 | Han | 345/156 |
| 2004/0085271 | A1 * | 5/2004 | Koll et al. | 345/82 |
| 2004/0201621 | A1 * | 10/2004 | Stevens | 345/751 |
| 2005/0251037 | A1 * | 11/2005 | Watanabe et al. | 600/437 |
| 2006/0205497 | A1 * | 9/2006 | Wells et al. | 463/29 |
| 2006/0253778 | A1 * | 11/2006 | Kim | 715/700 |
| 2006/0285758 | A1 * | 12/2006 | Marugame | 382/236 |
| 2007/0141860 | A1 * | 6/2007 | Hernandez et al. | 439/38 |
| 2007/0157856 | A1 * | 7/2007 | Skoog et al. | 108/70 |
| 2008/0062151 | A1 * | 3/2008 | Kent | 345/177 |

FOREIGN PATENT DOCUMENTS

WO 0076210 12/2000

OTHER PUBLICATIONS http://www.merl.com/projects/DiamondTouch/.

* cited by examiner

*Primary Examiner*—Prabodh M Dharia
(74) *Attorney, Agent, or Firm*—Cantor Colburn LLP; Cynthia Seal

(57) ABSTRACT

A conference table display system, which includes a screen displayed on top of a conference table. The screen is capable of displaying multiple desktop views. The system further includes multiple storage devices, each storage device containing information related to a particular user. The location and size of each desktop view on the screen is associated with a particular storage device. The computer system causes information from the storage device to be displayed on the screen in a desktop view. When a new storage device is coupled to the computer system, the computer system adjusts the sizes and the locations of the desktop views displayed on the screen to enable information from the new storage device to be displayed on the screen in a desktop view at a location and of a size associated with the new storage device.

6 Claims, 2 Drawing Sheets

DYNAMIC CONFERENCE TABLE DISPLAY SYSTEM

BACKGROUND

The present invention relates generally to conferencing, and more particularly, to dynamic desktop conferencing.

A market is emerging for conference room solutions in which the conference room table behaves as a display that can be driven by a computer. Current solutions, like those provided by Mitsubishi and HP, allow a person's finger to serve as an input device to a table display. Details of Mitsubishi's conferencing device are provided at http://www.merl.com/projects/DiamondTouch. This device uses capacitive coupling. The number of users is limited, and people must be sitting in a special chair in order for this solution to work. While this is a good solution for a single computer desktop (just like a projector), it does not help in solving the problem of having more that one person present that might like to share part of the table to show their own data.

Other attempts have been made to develop a desktop conference table display, but they are also limited in terms of the number of people that may participate in a conference and in terms of functionality of the table.

There is thus a need for solving the problem of dynamically managing multiple desktops and expanding on the table functionality, while removing the need for people to carry laptops.

SUMMARY

According to exemplary embodiments, a dynamic conference table display system is provided. The system comprises a screen displayed on top of a conference table, wherein the screen is capable of displaying multiple individual desktop views. The system further comprises multiple storage devices, each storage device containing information related to a particular user. The location and size of each desktop view on the screen is associated with a particular storage device. The system further comprises a connector for coupling the multiple storage devices to a computer system that interfaces with the screen, such that when a storage device is coupled to the computer system via the connector, the computer system causes information from the storage device to be displayed on the screen in a desktop view at a location and of a size associated with the storage device. When a new storage device is coupled to the computer system, the computer system adjusts the sizes and the locations of the desktop views displayed on the screen to enable information from the new storage device to be displayed on the screen in a desktop view at a location and of a size associated with the new storage device.

BRIEF DESCRIPTION OF THE DRAWINGS

Referring to the exemplary drawings, wherein like elements are numbered alike in the several Figures.

DETAILED DESCRIPTION

According to an exemplary embodiment, a "screen", which may be incorporated into a conference table or disposed on top of it, dynamically segments itself so that it creates a desktop view for each person (user) sitting at the table and/or participating in the conference. Each desktop view is then capable of displaying user specific data obtained from a storage device. The desktop views may be dynamically resized and relocated on the screen so that every person sitting at the table has their own space. Data may be moved between desktop using "physical indicators" so that it is possible to share files between conference participants. This is described in more detail below.

Figure 1:
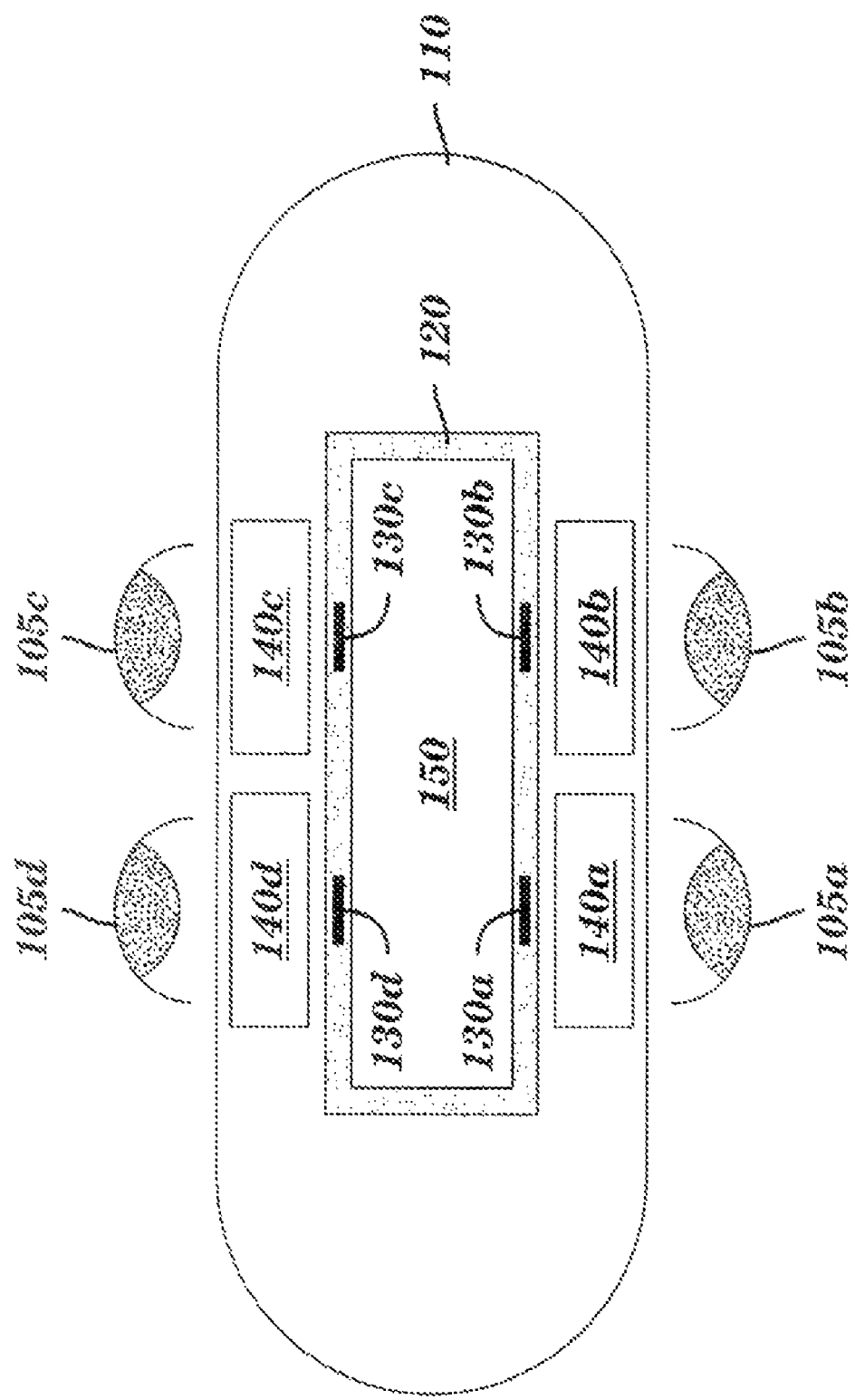
FIG. 1 illustrates an exemplary screen display on a conference room table according to an exemplary embodiment.

FIG. 1 illustrates a screen 110 displayed on top of a conference room table. The screen 110 may occupy most, if not all, of the table's surface. The screen may be displayed through the use of a projector or by embedding a display into the table's structure. An embedded display may include, for example, a flat panel Liquid Crystal Display (LCD), a plasma display panel, or an organic light emitting diode (OLED) display. The screen may be approximately the size of the table surface. The screen 110 serves as a vehicle to show any media that may complement the contents of a conference (e.g., presentations, documents, etc.). The display of information on the screen 110 may be driven by a computer system that may be attached to the table or be incorporated within the table. Although not shown in the interest of simplifying illustration, the computer system may be implemented with a special or general purpose digital computer, such as a personal computer (PC; IBM-compatible, Apple-compatible, or otherwise), workstation, minicomputer, or mainframe computer. As those skilled in the art will appreciate, such a computer system may include a processor for executing software, memory for storing software, and one or more input and/or output (I/O) devices.

As shown in FIG. 1, the table also includes a strip 120 to which storage devices 130a, 130b, 130c, and 130d may be connected. These devices serve as memories for storing user-specific information. They may be implemented with, e.g., a universal serial bus (USB) memory key. In one embodiment, the strip 120 is disposed in a designated area on the table to enable data communications between the storage devices 130a, 130b, 130c and 130d and the computer system through the use of magnetic induction. This allows the storage devices to be positioned or moved around the strip 120, without the need for disconnecting or cabling. The storage device 130a, 130b, 130c, and 130d may be designed to support magnetic induction, or a small cradle may be provided for each storage device to enable communication through magnetic induction. According to an exemplary embodiment, the magnetic field may not only enable communication with the storage devices, but may also power them.

The strip 120 connects the storage devices 130a, 130b, 130c, and 130d to local interfaces within the computer system. The local interfaces may include, for example, one or more buses or other wired or wireless connections which are, in turn, connected to the I/O devices within the computer system.

Each storage device 130a, 130b, 130c, and 130d contains information proprietary to and/or associated with its user 105a, 105b, 105c, and 105d, respectively. When a storage device is connected to the connection strip 120, the computer system reads information from the storage device and causes the information to be displayed within a desktop view associated with the storage device (shown as individual desktop views 140a, 140b, 140c, and 140d in FIG. 1). When the computer system is in operation, the processor is configured to execute commands from the storage devices communicatively connected to it to cause the screen to display desktop views. Although only four storage devices are shown and desktop views are shown for simplicity of illustration, it should be appreciated that any number of storage devices may be connected to the strip to cause any number of desktop views to be displayed, depending, e.g., on the number of participants in the conference and/or the size of the table and minimum size of the desktop views.

According to one embodiment, a desktop view if displayed on the screen at a location between the storage device and the edge of the table, and the desktop view is centered on the screen at the storage device's location. If the storage device moves, the desktop view moves with it. The size of the desktop view may be determined by the number of desktops being displayed at a given moment. For example, if there is only one person using the conference table, the desktop view may occupy a portion of the screen that is the width of the table or a maximum width that may be set by the user. If there are multiple users, the desktop views may each occupy a predetermined amount of space on the screen for each user.

The moderator of the conference can take control of a shared central portion 150 of the screen, to display the respective media, e.g., slides, and make any files or other data he or she desires available (viewable) to the remaining participants. In addition to viewing the shared content, the remaining participants may view the content displayed on their respective desktop views without that content being accessed by anyone else in the conference. Also, the participants may send files or other content to other individual participants, e.g., by selecting user's names from a list, or placing them in the shared space 150. The users may also make specific portions of their desktop views visible to one or multiple participants.

Figure 2:
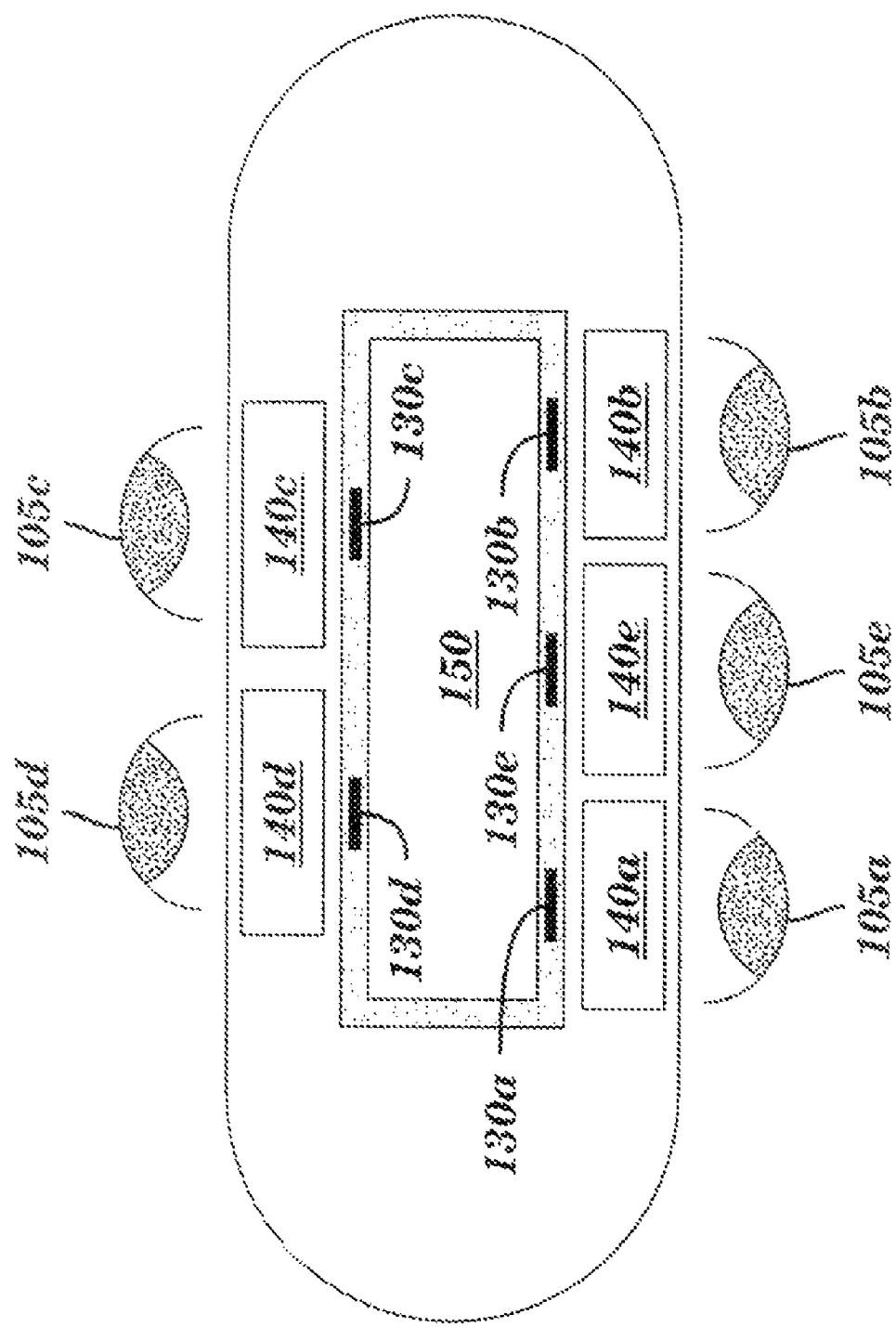
FIG. 2 illustrates how an exemplary screen display on a conference room table may change when a new user joins a conference according an exemplary embodiment.

Referring to FIG. 2, if a new user 105*e* joins the conference, the desktop views 105*a* and 105*b* for the users sitting on the same side of the table as the user 105*e* may be dynamically and automatically resized and relocated so that all desktop views displayed on the screen on that side of the table (140*a*, 140*b*, and 140*e* in FIG. 2) are of an appropriate size and location, e.g., equal size and centered on the screen at the location of each storage device. This allows for the connection of multiple storage devices to the conference table display system as more and more participants physically join the conference.

According to an exemplary embodiment, user input may be captured either by making the table top a touch sensitive device, through the use of table stylus techniques, such as those in Wacom devices, or by using a product such as Mitsubishi's Diamond Touch, described at http://www.merl.com/projects/DiamondTouch. This allows for simple point and click functionality and provides the ability to take notes. In one embodiment, files and other content may be transferred from one participant to another using physical indicators by drawing arrows on the touch-sensitive table top, from one desktop view to the other. For example, a user may select the file to be transferred, draw an arrow to another user's desktop view, and then software such as that provided in Wacom devices or Mitsubishi's device may then detect the arrow, extrapolate the line, and transfer the file to the desktop view of the other user. As an alternative, as noted above, a user may transfer information, such as a file, to another user by picking the other user's name from a list, and the transferred information may be displayed on the other user's desktop view.

Access to the conference table system may be determined by a meeting invitation. Each participant may be given a randomly generated password that will allow him or her to "log into" the conference table display system. The moderator may have the ability to add/remove participants when he or she logs in.

If the conference is being conducted in different sites, then two or more conference table display systems may be remotely connected to allow for sharing information between all users in both sites.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dynamic conference table display system, comprising:
a screen displayed on top of a conference table, wherein the screen is capable of displaying multiple individual desktop views, the screen covering the entirety of a top surface of the conference table;
multiple storage devices, each storage device containing information related to a particular user, wherein the location and size of each desktop view on the screen is associated with a particular storage device; and
a connector for coupling the multiple storage devices to a computer system that interfaces with the screen, wherein when a storage device is coupled to the computer system via the connector, the computer system causes information from the storage device to be displayed on the screen in a desktop view at a location and of a size associated with the storage device, and wherein when a new storage device is coupled to the computer system, the computer system adjusts the sizes and the locations of the desktop views displayed on the screen to enable information from the new storage device to be displayed on the screen in a desktop view at a location and of a size associated with the new storage device, and wherein when the storage device is moved in relation to the top surface of the conference table the view moves automatically along the display with the storage device.

2. The dynamic conference table display system of claim 1, wherein the connector is a strip disposed on the table that allows the storage devices to communicate with the computer system via magnetic induction.

3. The dynamic conference table display system of claim 1, wherein the size of each desktop view depends on the number of desktop views being displayed, and the location of each desktop view depends upon the location of the associated storage device.

4. The dynamic conference table display device of claim 1, wherein the screen is touch-sensitive and enables users to input information to be displayed in the desktop views and transfer information between desktop views.

5. The dynamic conference table display device of claim 1, wherein the screen comprises a shared screen space in a central location for displaying information to all the users.

6. The dynamic conference table display device of claim 4, wherein the screen enables users to transfer information to other users by selecting user names from a list of users.

* * * * *